United States Patent
Austin

(10) Patent No.: US 7,347,940 B2
(45) Date of Patent: Mar. 25, 2008

(54) NITROGEN REMOVAL SYSTEM AND METHOD FOR WASTEWATER TREATMENT LAGOONS

(75) Inventor: David C. Austin, El Prado, NM (US)

(73) Assignee: Worrell Water Technologies, LLC, Charlottesville, VA (US)

( * ) Notice: Subject to any disclaimer, the term of this patent is extended or adjusted under 35 U.S.C. 154(b) by 494 days.

(21) Appl. No.: 11/114,340

(22) Filed: Apr. 26, 2005

(65) Prior Publication Data

US 2005/0279703 A1 Dec. 22, 2005

Related U.S. Application Data

(60) Provisional application No. 60/580,562, filed on Jun. 17, 2004.

(51) Int. Cl.
*C02F 3/30* (2006.01)
*C02F 3/06* (2006.01)
*C02F 3/08* (2006.01)

(52) U.S. Cl. .................. 210/605; 210/616; 210/617; 210/622; 210/150; 210/170.08; 210/259; 210/903

(58) Field of Classification Search ............... 210/602, 210/605, 615–618, 621, 622, 630, 903, 150, 210/151, 170.01, 170.08, 252, 259
See application file for complete search history.

(56) References Cited

U.S. PATENT DOCUMENTS

| | | | |
|---|---|---|---|
| 681,884 | A | 9/1901 | Monjeau |
| 2,306,027 | A | 12/1942 | Swaney |
| 2,486,512 | A | 11/1949 | Armstrong |
| 2,822,329 | A | 2/1958 | Griffith |
| 3,385,786 | A | 5/1968 | Klock |
| 3,563,888 | A | 2/1971 | Klock |

(Continued)

FOREIGN PATENT DOCUMENTS

DE 1916044 11/1969

(Continued)

OTHER PUBLICATIONS

Solar Aqua Systems, Inc. Marketing brochure, 1978.

(Continued)

*Primary Examiner*—Fred G. Prince
(74) *Attorney, Agent, or Firm*—Allen, Dyer, Doppelt, Milbrath & Gilchrist, P.A.

(57) ABSTRACT

A wastewater treatment process integrates a tidal nitration system with a wastewater treatment lagoon. Raw effluent enters a lagoon having a persistent anoxic or anaerobic state and a long residence time to permit suspended solids to settle to the bottom, forming a blanket of sludge. Water above the sludge blanket is comparatively clearer than raw influent. Discharge from the clear water zone contains organic carbon, organic nitrogen, ammonia, and other nutrients. In the lagoon, complex carbohydrates and fats are broken down into simpler organic compounds by bacterial action, a substantial portion transformed to carbon dioxide by bacterial respiration, reducing BOD. Organic forms of nitrogen are transformed into ammonium ions by bacterial action. Adjacent to the lagoon is a sump that takes water from the clear zone to a tidal cell, and recycles water from the clear zone into the tidal cell, which then discharges back into the lagoon.

30 Claims, 1 Drawing Sheet

U.S. PATENT DOCUMENTS

| | | |
|---|---|---|
| 3,598,726 A | 8/1971 | Welch |
| 3,768,200 A | 10/1973 | Klock |
| 3,770,623 A | 11/1973 | Seidel |
| 3,925,206 A | 12/1975 | Dea |
| 4,008,159 A | 2/1977 | Besik |
| 4,039,451 A | 8/1977 | Smith |
| 4,057,933 A | 11/1977 | Enyeart |
| 4,169,050 A | 9/1979 | Serfling et al. |
| 4,183,809 A | 1/1980 | Klapwijk et al. |
| 4,267,038 A | 5/1981 | Thompson |
| 4,277,342 A | 7/1981 | Hayes et al. |
| 4,284,508 A | 8/1981 | Jewell |
| 4,331,538 A | 5/1982 | Kickuth |
| 4,333,837 A | 6/1982 | Plósz et al. |
| 4,384,956 A | 5/1983 | Mulder |
| 4,415,450 A | 11/1983 | Wolverton |
| 4,443,337 A | 4/1984 | Otani et al. |
| 4,482,458 A | 11/1984 | Rovel et al. |
| 4,620,931 A | 11/1986 | Hirata et al. |
| 4,678,582 A | 7/1987 | Lavigne |
| 4,735,723 A | 4/1988 | Mulder |
| 4,746,435 A | 5/1988 | Onishi et al. |
| 4,793,929 A | 12/1988 | Kickuth et al. |
| 4,839,051 A | 6/1989 | Higa |
| 4,872,985 A | 10/1989 | Dinges |
| 4,895,645 A | 1/1990 | Zorich, Jr. |
| 4,904,386 A | 2/1990 | Kickuth |
| 4,921,604 A | 5/1990 | Moellenbeck |
| 4,959,084 A | 9/1990 | Wolverton et al. |
| 4,997,568 A | 3/1991 | Vandervelde et al. |
| 5,078,882 A | 1/1992 | Northrop |
| 5,078,884 A | 1/1992 | Mulder |
| 5,087,353 A | 2/1992 | Todd et al. |
| 5,126,050 A | 6/1992 | Irvine et al. |
| 5,137,625 A | 8/1992 | Wolverton |
| 5,174,897 A | 12/1992 | Wengrzynek |
| 5,192,442 A * | 3/1993 | Piccirillo et al. ........... 210/605 |
| 5,259,959 A | 11/1993 | Mulder |
| 5,337,516 A | 8/1994 | Hondulas |
| 5,389,257 A | 2/1995 | Todd et al. |
| 5,393,426 A | 2/1995 | Raskin et al. |
| 5,486,291 A | 1/1996 | Todd et al. |
| 5,487,829 A | 1/1996 | Safferman et al. |
| 5,518,618 A | 5/1996 | Mulder et al. |
| 5,536,407 A * | 7/1996 | Petersen ..................... 210/605 |
| 5,565,098 A | 10/1996 | Vellinga |
| 5,618,413 A | 4/1997 | Todd et al. |
| 5,626,644 A | 5/1997 | Northrop |
| 5,733,453 A | 3/1998 | DeBusk |
| 5,755,852 A | 5/1998 | Northrop |
| 5,766,474 A | 6/1998 | Smith et al. |
| 5,785,864 A | 7/1998 | Teran et al. |
| 5,788,842 A | 8/1998 | Frisch |
| 5,820,759 A | 10/1998 | Stewart et al. |
| 5,863,433 A | 1/1999 | Behrends |
| 5,863,435 A | 1/1999 | Heijnen et al. |
| 5,876,484 A | 3/1999 | Raskin et al. |
| 5,893,975 A | 4/1999 | Eifert |
| 5,897,777 A | 4/1999 | Zoeller et al. |
| 5,904,850 A | 5/1999 | Vellinga |
| 5,906,745 A | 5/1999 | Eto |
| 5,948,262 A | 9/1999 | Todd et al. |
| 5,951,866 A | 9/1999 | Grove et al. |
| 5,985,149 A | 11/1999 | Raetz et al. |
| 6,045,695 A | 4/2000 | Janssen et al. |
| 6,063,273 A | 5/2000 | Habets et al. |
| 6,086,755 A | 7/2000 | Tepper |
| 6,090,294 A | 7/2000 | Teran et al. |
| 6,126,827 A | 10/2000 | Johnson, Jr. et al. |
| 6,159,371 A | 12/2000 | Dufay |
| 6,171,480 B1 | 1/2001 | Lee et al. |
| 6,183,642 B1 | 2/2001 | Heijnen et al. |
| 6,200,469 B1 | 3/2001 | Wallace |
| 6,210,578 B1 | 4/2001 | Sagastume et al. |
| 6,217,766 B1 | 4/2001 | Stetter et al. |
| 6,221,652 B1 | 4/2001 | Janssen et al. |
| 6,277,274 B1 | 8/2001 | Coffman |
| 6,383,390 B1 | 5/2002 | Van Loosdrecht et al. |
| 6,406,627 B1 | 6/2002 | Wallace |
| 6,447,681 B1 | 9/2002 | Carlberg et al. |
| 6,447,682 B1 | 9/2002 | Flowers |
| 6,585,886 B1 | 7/2003 | Luehr |
| 6,645,374 B2 | 11/2003 | Cote et al. |
| 6,692,642 B2 | 2/2004 | Josse et al. |
| 6,923,906 B2 * | 8/2005 | Oswald et al. .............. 210/188 |
| 2002/0148779 A1 | 10/2002 | Shieh et al. |
| 2002/0185437 A1 | 12/2002 | Haridas et al. |
| 2003/0111409 A1 | 6/2003 | Austin et al. |
| 2004/0000517 A1 | 1/2004 | Austin et al. |
| 2004/0178132 A1 | 9/2004 | Nakhla et al. |
| 2004/0206699 A1 | 10/2004 | Ho et al. |
| 2005/0051482 A1 * | 3/2005 | Austin ........................ 210/619 |

FOREIGN PATENT DOCUMENTS

| | | |
|---|---|---|
| DE | 3941211 | 6/1991 |
| DE | 300 015 A7 | 5/1992 |
| GB | 1 579 623 | 11/1980 |
| GB | 2 182 651 | 5/1987 |
| JP | 58-70891 | 4/1983 |
| JP | 10-15586 | 1/1998 |
| JP | 2000-246283 | 9/2000 |
| KR | 2001-109976 | * 12/2001 |
| RU | 2107041 | 3/1998 |
| SU | 1346588 | 10/1987 |
| WO | WO 95/17351 | 6/1995 |
| WO | 02/076893 | 10/2002 |

OTHER PUBLICATIONS

Reed, Sherwood and Bastian, Robert, "Aquaculture Systems for Wastewater Treatment: An Engineering Assessment," U.S. Environmental Protection Agency Office of Water Program Operations Municipal Construction Division, 132 pages, Jun. 1980.

Jewell, W. J. et al., "Wastewater Treatment with Plants in Nutrient Films," U.S. Environmental Protection Agency, EPA-600/S2-83-067, pp. 1-5, Oct. 1983.

Jewell, William J., "Anaerobic Sewage Treatment," Environmental Science & Technology, vol. 21, pp. 14-21, Jan. 1987.

Zhu, T. et al., "Phosphorus Sorption and Chemical Characteristics of Lightweight Aggregates (LWA) Potential Filter Media in Treatment Wetlands," Wat. Sci. Tech., vol. 35, No. 5, pp. 103-108, 1997.

Austin, David, "Final Report on The South Burlington, Vermont Advanced Ecologically Engineered System (AEES) for Wastewater Treatment," U.S. Environmental Protection Agency, pp. i-M2, Mar. 4, 2000.

Alleman, James E., "The History of Fixed-Film Wastewater Treatment Systems," pp. 18, retrieved on Jul. 14, 2004. Retrieved from the Internet: <URL:http://bridge.ecn.purdue.edu/~alleman/w3-class/456/article/article-biofilmhistory.html>.

Lazarova, Valentina and Manem, Jacques, "Innovative Biofilm Treatment Technologies for Water and Wastewater Treatment," *Biofilms II: Process Analysis and Applications*, pp. 159-206, 2000.

Sun et al., "Treatment of Agricultural Wastewater in a Combined Tidal Flow-Downflow Reed Bed System," Water Science Technology, vol. 40, No. 3, pp. 139-146, 1999.

Rakocy, James E., "Integrating Tilapia Culture with Vegetable Hydroponics in Recirculating Systems," Tilapia Aquaculture in the Americas, vol. 1, pp. 163-184, World Aquaculture Society, Baton Rouge, Louisiana, 1997.

McBride, Graham B. and Tanner, Chris C., "Modelling Biofilm Nitrogen Transformations in Constructed Wetland Mesocosms with Fluctuating Water Levels," Ecological Engineering 14, pp. 93-106, Elsevier Science B.V., 2000.

Nguyen, Long M., "Organic Matter Composition, Microbial Biomass and Microbial Activity in Gravel-Bed Constructed Wetlands Treating Farm Dairy Wastewaters," Ecological Engineering 16, pp. 199-221, Elsevier Science B.V., 2000.

Tanner, Chris C. et al., "Effect of Water Level Fluctuation on Nitrogen Removal from Constructed Wetland Mesocosms," Ecological Engineering 12, pp. 67-92, Elsevier Science B.V., 1999.

Von Felde, Katrin and Kunst, Sabine, "N- and Cod-Removal in Vertical-Flow Systems," Water Science Technology, vol. 35, No. 5, pp. 79-85, Permagon Press, Oxford, 1997.

Green, Michal et al., "Investigation of Alternative Method for Nitrification in Constructed Wetlands," Water Science Technology, vol. 35, No. 5, pp. 63-70, Permagon Press, Oxford, 1997.

Laber, Johannes et al., "Two Strategies for Advanced Nitrogen Elimination in Vertical Flow Constructed Wetlands," Water Science Technology, vol. 35, No. 5, pp. 71-77, Permagon Press, Oxford, 1997.

Watson, J.T. and Danzig, A.J., "Pilot-Scale Nitrification Studies Using Vertical-Flow and Shallow Horizontal-Flow Constructed Wetland Cells," Constructed Wetlands for Water Quality Improvement, pp. 301-313, CRC Press, Inc., 1993.

Swoboda-Colberg, Norbert et al., "Constructed Vertical Flow Aerated Wetlands," U.S. Department of Commerce Final Report, pp. 1-54, Dec. 1994.

\* cited by examiner

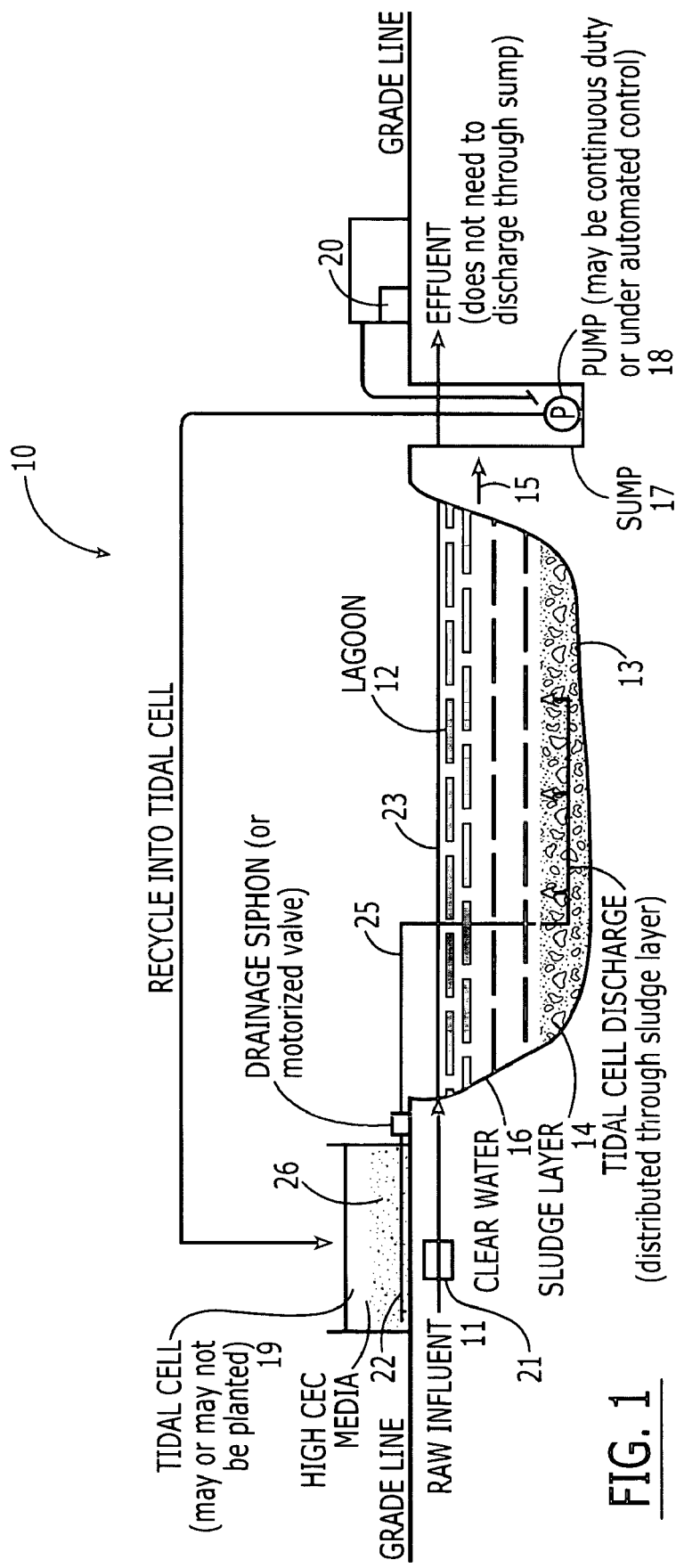

NITROGEN REMOVAL SYSTEM AND METHOD FOR WASTEWATER TREATMENT LAGOONS

CROSS-REFERENCE TO RELATED APPLICATION

This application claims priority to U.S. Provisional Application Ser. No. 60/580,562, filed on Jun. 17, 2004, entitled "Nitrogen Removal System and Method for Wastewater Treatment Lagoons," which is incorporated hereinto by reference. This application also incorporates by reference commonly owned applications "Integrated Tidal Wastewater Treatment System and Method," Ser. No. 10/377,287, filed Feb. 28, 2003, now U.S. Pat. No. 6,881,338; "Tidal Vertical Flow Wastewater Treatment System and Method, Ser. No. 10/463,199, filed Jun. 17, 2003, now U.S. Pat. No. 6,863,816; "Flood and Drain Wastewater Treatment System and Associated Methods," Ser. No. 60/500,654, filed Sep. 5, 2003; and "Tidal Vertical Flow Wastewater Treatment System and Method," Ser. No. 10/689,560, filed Oct. 20, 2003, now U.S. Pat. No. 6,896,805.

BACKGROUND OF THE INVENTION

Related Art

Nitrogen wastes from intensive agriculture adversely impact water quality in many areas of the United States and other areas of the world. These intensive operations include pig barns, milking facilities, and poultry facilities, where a large number of animals are contained within a small area. Animal feces and urine from these areas is typically treated in passive, anaerobic lagoon systems. Anaerobic lagoons can digest solid material and substantially reduce biological oxygen demand (BOD), but cannot remove significant quantities of nitrogen. Removal of nitrogen depends on oxidation of ammonia to nitrite or nitrate, which is an aerobic bacterial process. Anaerobic lagoons can efficiently denitrify oxidized nitrogenous compounds. In this process, a variety of bacteria use oxidized nitrogenous compounds as terminal electron acceptors in respiration. Anaerobic lagoons could therefore be effective means of nitrogen removal if they could be integrated with a nitrification step.

Nitrogen wastes from lagoons treating domestic wastewater also adversely impact water quality in many areas of the world. As with agricultural systems, these domestic wastewater treatment lagoons are mostly located in rural areas that do not have the economic resources of large municipal areas. Like agricultural systems, therefore, traditional treatment methods of nitrogen removal are either often not economically feasible or present a severe burden on limited resources.

Nitrification is, and historically has been, an expensive, energy-intensive process not suited to the economic conditions under which rural (both domestic and agricultural) wastewater treatment must operate. The theoretical oxygen-demand stoichiometry governing nitrogen removal in bulk water reveals that a great deal of oxygen is required to oxidize ammonia. Oxygen demand is high because chemical oxygen demand must be substantially exhausted before nitrification is no longer inhibited by competition from heterotrophic bacteria. The bulk water oxygen demand is given as:

$$\text{mg/L } O_2 \text{ demand} = (\text{COD influent} - \text{COD effluent}) + 4.6(NO_3)_f - 2.86(NO_3)_u \quad (1)$$

where COD is the chemical oxygen demand in mg/L, $(NO_3)_f$ is the nitrate formed in mg/L, and $(NO_3)_u$ is the amount of nitrate utilized in mg/L.

Oxygen transfer efficiency (kW hr/kg $O_2$ transferred) is limited by the low solubility of oxygen in water for conventional, bulk water, mechanical aeration processes required for nitrification. Clean, cold freshwater saturates at 10 to 12 mg/L $O_2$. Saturation of $O_2$ in wastewater is substantially less. The actual (field) oxygen transfer efficiency of mechanical aeration processes in wastewater is typically on the order of 4-16%, depending on a variety of factors. The inherent inefficiency of aeration of bulk water sufficient for nitrification incurs substantial capital operations costs.

Other, more efficient means of nitrification have recently emerged. These methods use flood and drain reactors that contain engineered media. When the reactor is flooded, $NH_4^+$ ions in bulk water adsorb to negatively charged media and biofilms. When the reactor is drained, atmospheric oxygen is drawn down into media pore spaces, causing rapid aeration of biofilms and subsequent nitrification of adsorbed $NH_4^+$ ions. Nitrate trapped in biofilms desorbs into bulk water in the next flooding cycle. Nitrate is then consumed as a terminal electron acceptor for bacterial respiration of carbon. The term tidal nitration is used here, by analogy to aeration, as a convenient way to denote the transfer of nitrate to bulk water by the ammonia sorption/nitrate desorption process in flood and drain cycles. The term nitration as used in chemistry denotes the attachment or substitution of a nitro group ($-NO_2$) to a molecule.

It is critical that a medium used in a tidal nitration system have a substantial cation exchange capacity (CEC), at least 4 meq/100 g media. Electrostatically neutral and low-CEC media perform poorly in this process.

Tidal nitration effectively harnesses both the efficiency of oxygen transfer in thin biofilms and the high solubility of nitrate in water. In contrast to oxygen, nitrate is highly soluble in water. Organic nitrogen and ammonia (total Kjehldahl nitrogen; TKN) are typically present in domestic wastewater in concentrations from 20 to 85 mg/L, which is several times that of the saturation value of oxygen in wastewater. In agricultural wastewater TKN concentrations can be much higher. Low-head pumps used in draining of marsh cells can have mechanical transfer efficiencies (wire to water) on the order of 80%. Therefore, TKN is converted to nitrate via a mechanical means that is several times more efficient than the mechanical transfer of oxygen to bulk wastewater. One kilogram of nitrate has the same oxidizing capacity as 2.86 kilograms of oxygen. Therefore, overall the energy efficiency for BOD (or COD) destruction of the nitration process is substantially greater than aeration.

The theoretical oxygen demand of the tidal nitration process clearly illustrates the potential energy efficiency of the process. It is clear that the tidal nitration process sharply reduces air demand as compared with bulk water nitrification (Table 1). The bulk water oxygen demand for a flood and drain reactor is given as:

$$\text{mg/L } O_2 \text{ demand} = (\text{COD influent} - \text{COD effluent}) - 2.86(NO_3)_u \quad (2)$$

TABLE 1

Comparison of bulk-water oxygen demand.

| System | Influent COD, mg/L | Effluent COD, mg/L | Influent TKN, mg/L | % nitrification | Nitrate formed, mg/L | Effluent nitrate, mg/L | Bulk water oxygen demand, mg/L |
|---|---|---|---|---|---|---|---|
| Activated sludge (modified Ludzack Ettinger process; MLE) | 400 | 10 | 45 | 95% | 42.75 | 5.0 | 479 |
| Tidal nitration | 400 | 10 | 45 | 95% | 42.75 | 5.0 | 282 |
| Eq. 1 | mg/L $O_2$ = (400-10) mg/L + 4.6(42.75) mg/L − 2.86(42.75-5.0) mg/L | | | | | | |
| Eq. 2 | mg/L $O_2$ = (400-10) mg/L − 2.86(42.75-5.0) mg/L | | | | | | |

SUMMARY OF THE INVENTION

The present invention addresses the problem of nitrogen waste removal in at least agricultural and domestic settings. A wastewater treatment system of the present invention comprises a lagoon adapted to receive wastewater and to maintain a persistent anoxic/anaerobic state. Means are provided for retaining incoming wastewater in the lagoon for a sufficient time to permit suspended solids to settle adjacent a bottom thereof, leaving a clearer water zone above the suspended solids.

A tidal cell is adapted to contain media and to alternate between a substantially flooded and a substantially emptied state for inducing alternating anoxic and aerobic states. Means are provided for transferring water from the clearer water zone to the tidal cell, for recycling water from the tidal cell back to the lagoon, and for removing treated water from the clearer water zone of the lagoon.

A method is also provided for treating wastewater. The method comprises the step of retaining wastewater in a first vessel so as to maintain a persistent anoxic/anaerobic state and to permit suspended solids to settle to adjacent a bottom thereof, leaving a clearer water zone above the suspended solids. Water is transferred from the clearer water zone to a second vessel containing media.

The second vessel is alternated between a substantially flooded and a substantially emptied state for inducing alternating anoxic and aerobic states therein. Water is recycled from the second vessel back to the first vessel. Treated water is then removed from the clearer water zone of the first vessel.

BRIEF DESCRIPTION OF THE DRAWING

THE FIGURE is a cross-sectional schematic drawing of an exemplary configuration of the present invention.

DESCRIPTION OF THE INVENTION

The present invention is directed to a wastewater treatment process and system 10 that integrate a tidal nitration system with one or more simple, conventional wastewater treatment lagoons (THE FIGURE).

Raw effluent 11 enters a wastewater lagoon 12 or pond. The lagoon 12 has sufficient volume to maintain a persistent anoxic or anaerobic state. Exemplary lagoons have been discussed in the above-listed applications that are incorporated by reference hereinto. Typically, a persistent anoxic or anaerobic state entails a hydraulic residence time (HRT) on the order of two or more days. Such an HRT is believed vital to treatment and is a standard design practice. A long HRT permits solids suspended in raw influent to settle to the bottom 13 of the lagoon 12. Accumulation of solids forms a blanket of organic and biological sludge 14 at the bottom of the lagoon 12. These design elements are an accepted standard for the design of wastewater treatment lagoons.

Water above the sludge blanket 14 is comparatively clearer than raw influent 11. Discharge 15 from the lagoon 12 is typically from the (comparatively) clear water zone. The discharge 15 typically contains a substantial concentration of organic carbon, organic nitrogen, ammonia, and other nutrients. Often, algae grow profusely in this layer. The sludge blanket contains a much higher concentration of organic carbon than does the clear layer 16.

During the time that wastewater resides in the lagoon 12, a number of important transformations take place in wastewater constituents. Complex carbohydrates and fats are broken down into simpler organic carbon compounds by bacterial action. A substantial portion of these simpler carbon compounds are transformed to carbon dioxide by bacterial respiration. Thus BOD is typically reduced in the treatment lagoon 12. Organic forms of nitrogen, such as proteins and urea are transformed into ammonium ions ($NH_4^+$) by bacterial action. These transformations of wastewater constituents in a treatment lagoon 12 are favorable elements in the present invention.

Adjacent to the lagoon 12 is a sump 17 that takes water from the clear zone 16. Within the sump 17 is located a pump 18 that transfers water from the sump 17 to at least one tidal cell 19. The pump 18 transfers water from the clear zone 16 into the tidal cell 19, which then discharges back into the lagoon 12.

Although the present system 10 depicts one lagoon 12, lagoons in series may be included to optimize lagoon treatment performance. In this case the point of transfer from lagoon 12 to tidal cell(s) 19 would be chosen to best optimize nitrogen removal. That is, the point of transfer may be from any lagoon 12 to the tidal cell(s) 19. The most likely lagoon to receive recycle would likely be the first or a second lagoon, where the most organic carbon is present and the most strongly anoxic or anaerobic conditions prevail.

The pump 18 may be controlled by a processor 20 that turns it on or off according to a set program with appropriate inputs, such as, but not limited to, run time and water level sensors. Alternatively, the pump 18 may run continuously at a rate substantially less than the drainage rate of a discharge siphon (or functionally equivalent device) in the tidal cell 19. In the latter instance, the tidal cell(s) 19 would fill continuously from the pump 18, but drain at a sufficiently fast rate so as to effectively empty even with an influent pump 21 running.

Water from the clear zone 16 of the lagoon 12 fills the tidal cell(s) 19. Multiple tidal cells 19 are preferably in a parallel arrangement, but may be used in series (in a series configuration some means of transferring water from cell to cell is needed). Each tidal cell 19 floods from pumped recycle and drains through a bottom drain system 22. A convenient drainage design provides for substantially vertical flow into the bottom drain system 22. A horizontal flow path through a tidal cell is allowable, as long as the cell drains to effective field capacity at the end of each drain cycle. Effective field capacity is defined as the cell's being drained to the point that discharge is an insubstantial trickle.

Tidal cells 19 are preferably elevated above the lagoon high-water level 23. This position of the tidal cell(s) 19 permits gravity discharge therefrom via a discharge siphon 24 or the opening of a valve controlling flow from the under-drain system 22. A discharge siphon 24 would be sized to permit a sufficiently rapid evacuation of a tidal cell' water volume to almost fully drain even when receiving continually pumped recycle. Alternatively, the tidal cell(s) 19 may discharge when a motorized valve opens the under-drain system 22. If a motorized valve is used, automated control is used for actuation at a predetermined time.

There may be cases wherein a gravity drain system is impracticable. In such cases, a pumped drain may be used instead of gravity drain.

Within the tidal cell(s) 19 a tidal nitration process occurs throughout flood and drain cycles as described. Alternating aerobic and anoxic conditions within the tidal cell(s) 19 also permit a substantial degree of nitrogen removal (nitrification and denitrification) within the cell(s) 19.

Effluent 25 from the tidal cell(s) 19 discharges into the lagoon 12 at a point where low oxidation reduction potential and abundant organic carbon optimize nitrogen removal. This discharge point is most likely to be at the bottom 13 of the lagoon 12. By distributing tidal cell discharge at the bottom 13 of the lagoon 12, nitrate-rich water will pass through the most carbon-rich area of the lagoon 12.

The long HRT of the lagoon 12 aids the nitrogen removal process in two important ways. A long HRT entails a surface area large enough to favor settling of solids within the waste stream. One potential danger of recycling tidal cell effluent to the bottom 13 of the pond 12 is resuspension of settled solids. This danger, however, is not realized in the present system 10 because of the large lagoon surface area, which permits a high hydraulic loading without harm the settling characteristics that establish the sludge blanket 14. The longer HRT also provides a period of residence for the average recycle nitrate molecule sufficient to be consumed by bacterial respiration.

The extent of nitrogen removal is a function of the recycle rate through the tidal cell(s) 19, where nitrification occurs, and the lagoon 12, where denitrification occurs. The optimum recycle rate is likely to be in the range of 0.5 to 10 exchanges of the lagoon volume through the tidal cell(s) 19. The wide range of recycle rates is a consequence of varying wastewater strengths, lagoon configurations, and practical limitations imposed by specific site conditions. As some point, a high recycle rate would be self-defeating. Denitrification occurs within the lagoon 12 as a function of available organic carbon under anoxic conditions. Too much recycling will destroy anoxic conditions by introducing too much oxygen diffused into wastewater from the thin films of water in the tidal cell 19.

The design of the tidal cell 19 is flexible. An important point is that a tidal cell 19 floods, drains, and nitrifies as a result of the tidal nitration process described above. The cell 19 itself can be a reactor in a packed bed, expanded bed, or fluidized bed configuration. In all cases, the media 26 in these reactors preferably has a CEC of at least 4 meq/100 g media. Each type of reactor is described in the following. Additional details of exemplary reactors may be found in the applications indicated above as having been incorporated by reference hereinto.

A packed bed reactor configuration is a container of varying size that contains immobile media. Wastewater is treated as it flows through the media. The advantages of a packed bed reactor includes its simplicity and low cost. A disadvantage of a packed bed reactor is that it cannot easily recover from plugging of media pore spaces by bacterial growth or particles in the wastewater. To avoid plugging, wastewater must be spread out over a much larger area than in expanded bed or fluidized bed reactors. The present system 10 envisions packed bed reactors as an attractive option where space permits the larger area required. Planting the packed bed reactor with wetland plants enhances the treatment performance of the reactor.

The fill and drain scheme described above using a drainage siphon is most appropriate to a packed bed reactor. Moreover, the low cost and simplicity of the packed bed reactor is more suitable to agricultural wastewater treatment.

An expanded bed reactor is a container of varying size that contains media expanded by an upward flow of water. An expanded media bed occupies a volume substantially larger under the influence of an upward flow of a fluid than it occupies without the upward flow of fluid. The degree of expansion ranges between 10% and 100%. Expansion rates over 100% induce fluidization. An advantage of an expanded bed reactor is that bed expansion resists plugging of media pore spaces by bacterial growth or particles within the wastewater. Excess bacteria and particles are scoured and carried away in the upward flow of water. An expanded bed reactor can withstand a high wastewater loading rate without plugging and thus occupies a smaller area than a packed bed reactor. A disadvantage of an expanded bed reactor is the added complication and expense required to provide a means of expanding the bed.

An expanded bed reactor in the present system 10 would undergo expansion of the media bed as it floods. A control system would be required to flood the reactor to a desired point, allowing some overflow in the flood stage for the upward flow of water to carry scoured material into the lagoon 12, where it can settle. At the end of the flood stage inflow of water stops. A valve then opens under command of the control system to allow the bottom drain system 22 to discharge into the bottom 13 of the lagoon 12, as described above. The drainage valve then closes, and the cycle repeats.

A fluidized bed reactor is similar to an expanded bed reactor. In a fluidized reactor the upward flow is sufficiently forceful to cause the media to circulate in a fluidic manner within the reactor. Advantages of a fluidized reactor include smaller area and increased treatment capacity over that of an expanded bed reactor. Fluidization of media permits the use of much smaller media than a packed bed reactor because of the greater scouring action to resists plugging. Smaller-diameter media have a very high specific surface area ($m^2$ per $m^3$ media), permitting high reaction rates. A disadvantage is the greater expense and complication over an expanded bed reactor.

In the present system 10 a fluidized reactor can function essentially the same as a packed bed reactor. One difference would be that the media would fluidize during the flood stage, rather than merely expand.

It is also possible to fluidize a reactor that contains floating media. In this configuration the reactor floods by any hydraulically convenient means. Upward flow of water into the reactor is not required as in an expanded bed reactor or a fluidized reactor. Rather, the reactor floods to a predetermined depth that permits the media to float with a clear (non-media) zone of water underneath. For example, 50% of the flooded volume might be occupied by floating media at the end of the flood cycle. When the predetermined flooded volume of the reactor has been attained, flooding stops and aeration begins. Aeration of the reactor, such as with fine-bubble diffusers, causes the floating media to sink, circulate in the turbulent water/air mixture, and fully fluidize. Fluidization continues as long as aeration continues. At the end of the flood cycle aeration stops, there is a quiescent period where biosolids scoured in the fluidization process settle to the bottom of the reactor, and then the tidal cell drains when a valve opens the bottom drain systems. Effluent from the tidal cell(s) then discharges to the bottom of the lagoon as described earlier.

Control of the flood-aeration-drain cycle can preferably be provided by a computer with a process control program and sensor inputs, such as, but not intended to be limited to, a level sensor.

The present system 10 provides the following improvements to the art:

1. The system 10 provides energy-efficient, low-cost nitrogen removal from wastewater that is highly competitive with existing technology.

2. The system 10 represents a substantial improvement to the treatment capacity of low-cost wastewater treatment lagoons, not only in terms of nitrogen removal, but also BOD. Removal of BOD is enhanced because of the introduction of oxygen and nitrate, both high-energy terminal electron acceptors for bacterial respiration, into the wastewater treatment lagoon.

3. The system 10 enables a simple means of retrofitting existing lagoons with adjacent tidal cells to provide nitrogen removal that is impossible with lagoons alone.

4. The system 10 avoids the complexity and energy inefficiency of bulk water aeration to nitrify wastewater.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A wastewater treatment system comprising:
   a lagoon adapted to receive wastewater and to maintain a persistent anoxic/anaerobic state;
   means for retaining incoming wastewater in the lagoon for a sufficient time to permit suspended solids to settle adjacent a bottom thereof, leaving a clearer water zone above the suspended solids;
   a tidal cell adapted to contain media and to alternate between a substantially flooded and a substantially emptied state for inducing alternating anoxic and aerobic states;
   means for transferring water from the clearer water zone to the tidal cell;
   means for recycling water from the tidal cell back to the lagoon; and
   means for removing treated water from the clearer water zone of the lagoon.

2. The wastewater treatment system recited in claim 1, wherein the lagoon is further adapted to support a residence of bacteria for breaking down complex carbohydrates and fats into simpler organic carbon compounds, for transforming the simpler organic carbon compounds into carbon dioxide, and for transforming at least some organic forms of nitrogen into ammonium ions.

3. The wastewater treatment system recited in claim 1, wherein the lagoon comprises a plurality of lagoons connected in series to each other.

4. The wastewater treatment system recited in claim 3, wherein the transferring means comprises means for transferring water from the clearer water zone of at least one of a first and a second lagoon to the tidal cell top.

5. The wastewater treatment system recited in claim 1, wherein the retaining means comprises means for retaining the incoming wastewater in the lagoon for a period of at least two days.

6. The wastewater treatment system recited in claim 1, wherein the water transferring means comprises a pump.

7. The wastewater treatment system recited in claim 6, wherein the retaining means comprises a processor in signal communication with the pump for controlling an activation thereof.

8. The wastewater treatment system recited in claim 6, further comprising a second pump in fluid communication with the lagoon and with a source of wastewater and adapted to control a flow of wastewater entering the lagoon.

9. The wastewater treatment system recited in claim 1, wherein the tidal cell is adapted to function in one of substantially horizontal and substantially downward vertical flow.

10. The wastewater treatment system recited in claim 9, wherein the tidal cell comprises a vertical flow cell, and the recycling means comprises means for channeling water from a bottom of the tidal cell to the lagoon.

11. The wastewater treatment system recited in claim 10, wherein the tidal cell bottom is positioned above a high-water level of the lagoon, and the water channeling means comprises an underdrain system positioned beneath the tidal cell bottom from which water enters the lagoon under gravity flow.

12. The wastewater treatment system recited in claim 11, wherein the tidal cell further comprises means for controlling a flow of water exiting the tidal cell.

13. The wastewater treatment system recited in claim 12, wherein the flow controlling means comprises one of a valve and a discharge siphon.

14. The wastewater treatment system recited in claim 12, further comprising a processor in signal communication with the flow controlling means for controlling actuation thereof.

15. The wastewater treatment system recited in claim 10, wherein the water channeling means comprises a pumped drain system.

16. The wastewater treatment system recited in claim 1, wherein the tidal cell comprises a reactor in one of a packed bed, an expanded bed, and a fluidized bed configuration.

17. The wastewater treatment system recited in claim 1, wherein the tidal cell media have a cation exchange capacity of at least 4 meq/100 g media.

18. The wastewater treatment system recited in claim 1, wherein the water recycling means comprises means for channeling water to a location adjacent a bottom of the lagoon.

19. The wastewater treatment system recited in claim 1, wherein the recycling means comprises means for recycling water at a rate in a range of 0.5 to 10 exchanges of a lagoon volume through the tidal cell.

20. A method for treating wastewater comprising the steps of:
retaining wastewater in a first vessel so as to maintain a persistent anoxic/anaerobic state and to permit suspended solids to settle to adjacent a bottom thereof, leaving a clearer water zone above the suspended solids;
transferring water from the clearer water zone to a second vessel containing media;
alternating the second vessel between a substantially flooded and a substantially emptied state for inducing alternating anoxic and aerobic states therein;
recycling water from the second vessel back to the first vessel; and
removing treated water from the clearer water zone of the first vessel.

21. The wastewater treatment method recited in claim 20, wherein the first vessel is adapted to support a residence of bacteria for breaking down complex carbohydrates and fats into simpler organic carbon compounds, for transforming the simpler organic carbon compounds into carbon dioxide, and for transforming at least some organic forms of nitrogen into ammonium ions.

22. The wastewater treatment method recited in claim 20, wherein the retaining step comprises retaining the incoming wastewater in the first vessel for a period of at least two days.

23. The wastewater treatment method recited in claim 20, wherein the water transferring step comprises pumping water from the clearer water zone to the second vessel.

24. The wastewater treatment method recited in claim 20, further comprising the step of electronically controlling an activation of the pumping step.

25. The wastewater treatment method recited in claim 20, further comprising the step of pumping wastewater into the first vessel and electronically controlling the wastewater pumping step.

26. The wastewater treatment method recited in claim 20, wherein the second vessel is adapted to act via vertical flow, and the recycling step comprises channeling water from a bottom of the second vessel to the first vessel.

27. The wastewater treatment method recited in claim 26, wherein first and the second vessel are relatively positioned so that the water channeling step can occur under gravity flow.

28. The wastewater treatment method recited in claim 27, further comprising the step of controlling a flow of water exiting the second vessel.

29. The wastewater treatment method recited in claim 20, wherein the water recycling step comprises channeling water to a location adjacent a bottom of the first vessel.

30. The wastewater treatment method recited in claim 20, wherein the recycling step comprises recycling water at a rate in a range of 0.5 to 10 exchanges of a first vessel volume through the second vessel.

* * * * *